United States Patent
Hu et al.

(10) Patent No.: US 11,971,620 B2
(45) Date of Patent: Apr. 30, 2024

(54) DISPLAY PANEL AND ELECTRONIC DEVICE

(71) Applicants: WUHAN BOE OPTOELECTRONICS TECHNOLOGY CO., LTD., Hubei (CN); BOE TECHNOLOGY GROUP CO., LTD., Beijing (CN)

(72) Inventors: Yang Hu, Beijing (CN); Yuanhui Guo, Beijing (CN); Xia Shi, Beijing (CN); Yujie Gao, Beijing (CN)

(73) Assignees: WUHAN BOE OPTOELECTRONICS TECHNOLOGY CO., LTD., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/907,986

(22) PCT Filed: Nov. 22, 2021

(86) PCT No.: PCT/CN2021/131962
§ 371 (c)(1),
(2) Date: Aug. 30, 2022

(87) PCT Pub. No.: WO2022/151836
PCT Pub. Date: Jul. 21, 2022

(65) Prior Publication Data
US 2023/0116568 A1  Apr. 13, 2023

(30) Foreign Application Priority Data
Jan. 13, 2021 (CN) .......................... 202110041652.X

(51) Int. Cl.
G02F 1/1333 (2006.01)
G02F 1/1343 (2006.01)
G02F 1/1362 (2006.01)

(52) U.S. Cl.
CPC .. *G02F 1/133377* (2013.01); *G02F 1/134354* (2021.01); *G02F 1/136286* (2013.01)

(58) Field of Classification Search
None
See application file for complete search history.

(56) References Cited

U.S. PATENT DOCUMENTS 7,612,854 B2   11/2009   Kang
8,987,746 B2   3/2015    Chung et al.
(Continued)

FOREIGN PATENT DOCUMENTS

CN   1963606 A   5/2007
CN   1991556 A   7/2007
(Continued)

OTHER PUBLICATIONS

International Search Report from PCT/CN2021/131962 dated Feb. 25, 2022.
(Continued)

*Primary Examiner* — Ryan Crockett
(74) *Attorney, Agent, or Firm* — Calfee, Halter & Griswold LLP

(57) ABSTRACT

The present disclosure is related to a display panel and an electronic device. The display panel may include an array substrate and an opposing substrate. The array substrate includes scan lines, data lines, a first blocking wall and a second blocking wall. The first blocking wall and the second blocking wall are respectively arranged on opposite sides of at least one of the scan lines, and each of the first blocking wall and the second blocking wall includes a first blocking (Continued)

layer arranged in a same layer as the scan lines and a second blocking layer arranged in a same layer as the data lines. The distance between the first blocking layer and the scan line in a first direction is smaller than the distance between the second blocking layer and the scan line in the first direction.

13 Claims, 6 Drawing Sheets

(56) References Cited

U.S. PATENT DOCUMENTS

| | | | |
|---|---|---|---|
| 9,442,333 | B2 | 9/2016 | Um et al. |
| 9,715,855 | B2 | 7/2017 | Huang et al. |
| 9,851,610 | B2 | 12/2017 | Chang et al. |
| 9,858,870 | B2 | 1/2018 | Huang et al. |
| 9,897,865 | B2 | 2/2018 | Jiang et al. |
| 9,995,976 | B2 | 6/2018 | Jia et al. |
| 10,254,597 | B2 | 4/2019 | Xu et al. |
| 10,429,708 | B2 | 10/2019 | Liu et al. |
| 10,768,491 | B2 | 9/2020 | Li et al. |
| 11,099,437 | B2 | 8/2021 | Cheng et al. |
| 2002/0126241 | A1* | 9/2002 | Kurahashi ......... G02F 1/134363 349/114 |
| 2007/0153202 | A1 | 7/2007 | Kang et al. |
| 2010/0201933 | A1 | 8/2010 | Sonoda |
| 2010/0265448 | A1 | 10/2010 | Nakanishi |
| 2014/0160401 | A1 | 6/2014 | Yonemura |
| 2014/0319530 | A1 | 10/2014 | Chung et al. |
| 2015/0009465 | A1 | 1/2015 | Park |
| 2015/0108486 | A1* | 4/2015 | Um .................. H01L 27/124 257/72 |
| 2015/0109268 | A1 | 4/2015 | Huang et al. |
| 2016/0291423 | A1 | 10/2016 | Chang et al. |
| 2017/0108745 | A1 | 4/2017 | Jia et al. |
| 2017/0153480 | A1 | 6/2017 | Lv |
| 2017/0199410 | A1* | 7/2017 | Jiang ................. G02F 1/133345 |
| 2017/0278467 | A1 | 9/2017 | Huang et al. |
| 2018/0149931 | A1 | 5/2018 | Xu et al. |
| 2019/0041710 | A1* | 2/2019 | Liu .................... G02F 1/133345 |
| 2020/0174300 | A1* | 6/2020 | Cheng ............... H01L 27/1288 |

FOREIGN PATENT DOCUMENTS

| | | |
|---|---|---|
| CN | 101814511 A | 8/2010 |
| CN | 101968585 A | 2/2011 |
| CN | 202141876 U | 2/2012 |
| CN | 103488002 A | 1/2014 |
| CN | 103885256 A | 6/2014 |
| CN | 103941490 A | 7/2014 |
| CN | 104133312 A | 11/2014 |
| CN | 104181735 A | 12/2014 |
| CN | 104199223 A | 12/2014 |
| CN | 204422931 U | 6/2015 |
| CN | 104820322 A | 8/2015 |
| CN | 105158995 A | 12/2015 |
| CN | 105159001 A | 12/2015 |
| CN | 105572983 A | 5/2016 |
| CN | 105629591 A | 6/2016 |
| CN | 106353930 A | 1/2017 |
| CN | 106444171 A | 2/2017 |
| CN | 106526937 A | 3/2017 |
| CN | 103885256 B | 4/2017 |
| CN | 106773378 A | 5/2017 |
| CN | 107255879 A | 10/2017 |
| CN | 107272271 A | 10/2017 |
| CN | 107589587 A | 1/2018 |
| CN | 104181735 B | 4/2018 |
| CN | 108828822 A | 11/2018 |
| CN | 109188813 A | 1/2019 |
| CN | 109298570 A | 2/2019 |
| CN | 106444171 B | 6/2019 |
| CN | 110068968 A | 7/2019 |
| CN | 110082967 A | 8/2019 |
| CN | 110133920 A | 8/2019 |
| CN | 106353930 B | 9/2019 |
| CN | 110297364 A | 10/2019 |
| CN | 110764318 A | 2/2020 |
| CN | 109298570 B | 6/2020 |
| CN | 111308797 A | 6/2020 |
| CN | 111505870 A | 8/2020 |
| CN | 211741794 A | 10/2020 |
| CN | 214375724 U | 10/2021 |
| EP | 3671335 A1 | 6/2020 |
| KR | 20070020868 A | 2/2007 |
| KR | 20120045493 A | 5/2012 |
| KR | 20120107269 A | 10/2012 |
| KR | 20150026586 A | 3/2015 |
| KR | 20150078170 A | 7/2015 |
| KR | 101818452 B1 | 1/2018 |
| WO | 2020077818 A1 | 4/2020 |
| WO | 2021168683 A1 | 9/2021 |
| WO | 2021232986 A1 | 11/2021 |
| WO | 2021/232986 A9 | 1/2022 |

OTHER PUBLICATIONS

Written Opinion from PCT/CN2021/131962 dated Feb. 25, 2022.
International Search Report from PCT/CN2021/085622 dated Dec. 7, 2021.
Written Opinion from PCT/CN2021/085622 dated Dec. 7, 2021.
Written Opinion from PCT/CN2022/071870 dated Mar. 22, 2022.
International Search Report from PCT/CN2022/071870 dated Mar. 22, 2022.
International Search Report from PCT/CN2021/083044 dated Jan. 6, 2022.
Written Opinion from PCT/CN2021/083044 dated Jan. 6, 2022.
Office action from U.S. Appl. No. 17/764,734 dated Sep. 29, 2023.
Communication from European Application No. 22739099.4 dated Nov. 27, 2023.
Office action from Indian Application No. 202227043318 dated Feb. 22, 2024.
Office action from European Application No. 21935493.3 dated Jan. 2, 2024.

* cited by examiner

DISPLAY PANEL AND ELECTRONIC DEVICE

CROSS REFERENCE TO RELATED APPLICATION(S)

The present disclosure is the national stage entry of PCT/CN2021/131962, filed on Nov. 22, 2021, which claims priority to a Chinese patent application No. 202110041652.X filed on Jan. 13, 2021 and titled "Display Panel and Electronic Device", the entire contents of which are incorporated herein by reference in their entirety.

TECHNICAL FIELD

The present disclosure relates to the display technical field, and in particular, to a display panel and an electronic device.

BACKGROUND

With the continuous developments of liquid crystal panels, high-resolution products are constantly being developed. However, with the increase of number of pixels, it is easy to lead to a series of problems. For example, when some pressure tests or drop tests are performed on the liquid crystal panels, uneven brightness such as bright spots or snowflakes are prone to occur. In addition, electrode structures in the panels may be easily affected by impurity particles during the manufacturing process, and accordingly unfavorable conditions such as broken lines may occur, which leads to pixel failure and reduces product yield, thereby affecting product reliability and product quality.

SUMMARY

An objective of embodiments of the present disclosure is to provide a display panel and an electronic device so as to at least to a certain extent overcome one or more problems due to limitations and deficiencies of related art.

According to a first aspect of the present disclosure, there is provided a display panel, including an array substrate and an opposing substrate which forms a cell with the array substrate:
wherein:
the array substrate includes a first substrate, scan lines, data lines, a first blocking wall and a second blocking wall, and the scan lines, the data lines, the first blocking wall and the second blocking wall are formed on a side of the first substrate close to the opposing substrate;
the data lines extend in a first direction, the scan lines extend in a second direction, and the first direction intersects with the second direction;
the first blocking wall and the second blocking wall are respectively arranged on opposite sides of at least one of the scan lines in the first direction, and each of the first blocking wall and the second blocking wall includes a first blocking layer arranged in a same layer as the scan lines and arranged apart from the scan lines and a second blocking layer arranged in a same layer as the data lines and arranged apart from the data lines, and an orthographic projection of the second blocking layer on the first substrate overlaps with an orthographic projection of the first blocking layer on the first substrate;
a distance between the first blocking layer and a corresponding one of the scan lines in the first direction is a first distance, a distance between the second blocking layer and the corresponding one of scan lines in the first direction is a second distance, and the second distance is greater than the first distance;
wherein:
the opposing substrate includes a second substrate and a spacer on a side of the second substrate close to the array substrate, a surface of the spacer close to the first substrate is a top surface, and an orthographic projection of the top surface of the spacer on the first substrate is within an orthographic projection of the corresponding one of the scan lines on the first substrate and between orthographic projections of the first blocking wall and the second blocking wall on the first substrate; and
a size of the top surface of the spacer in the first direction is greater than the first distance.

In an example embodiment of the present disclosure, a ratio between the size of the top surface of the spacer in the first direction and the first distance is greater than or equal to 2.

In an example embodiment of the present disclosure, a distance between the second blocking layer and the spacer in the first direction is a third distance, and a ratio between the third distance and the sizes of the top surface of the spacer in the first direction is greater than or equal to 0.5.

In an example embodiment of the present disclosure, the ratio between the third distance and the size of the top surface of the spacer in the first direction is greater than or equal to 1.

In an example embodiment of the present disclosure, the ratio between the third distance and a size of each of the data lines in the second direction is 2 to 4.

In an example embodiment of the present disclosure, the orthographic projection of the second blocking layer on the first substrate is within the orthographic projection of the first blocking layer on the first substrate, and the first direction is perpendicular to the second direction.

In an example embodiment of the present disclosure, the array substrate further includes first common lines formed on the first substrate and extending in the second direction, and the first common lines and the scan lines are arranged in a same layer and arranged apart from each other;
wherein the first blocking layer of the second blocking wall is a partial structure of a corresponding one of the first common lines.

In an example embodiment of the present disclosure, the array substrate further includes a plurality of sub-pixel units, which are arranged as an array on the first substrate along the second direction and the first direction;
wherein each of the sub-pixel units includes a pixel electrode, a common electrode and a transistor, wherein:
the transistor includes a gate electrode, a first electrode and a second electrode, the gate electrode is connected to one of the scan lines, the first electrode is connected to the pixel electrode, and the second electrode is connected to one of the data lines;
wherein an orthographic projection of the common electrode on the first substrate overlaps with an orthographic projection of the pixel electrode on the first substrate, and the common electrode is connected to one of the first common lines.

In an example embodiment of the present disclosure, the pixel electrode is arranged on a side of the common electrode away from the first substrate, and the pixel electrode includes:

a first electrode portion including a first connection bar extending in a first direction and a plurality of first electrode bars arranged at intervals in the first direction, wherein the first connection bar has a first side and a second side which are opposite in the second direction, the plurality of first electrode bars are arranged on the first side of the first connection bar and connected to the first connection bar, and ends of adjacent first electrode bars away from the first connection bar are in an open shape;

a second electrode portion arranged apart from the first electrode portion in the first direction, wherein the second electrode portion includes a second connection bar extending in the first direction and a plurality of second electrode bars arranged at intervals in the first direction, the second connection bar is located at a position on the first side away from the second side, the second connection bar has a third side and a fourth side which are opposite in the second direction, the third side is located at a position on the fourth side close to the first side, the plurality of second electrode bars are arranged on the third side of the second connection bar and connected to the second connection bar, and ends of adjacent second electrode bars away from the second connection bar are in an open shape; and a conductive connection portion arranged between the first electrode portion and the second electrode portion, wherein both ends of the conductive connection portion are connected to the first connection bar and the second connection bar, respectively, and an area of the conductive connection portion is larger than an area of each of the first electrode bars and an area of each of the second electrode bars.

In an example embodiment of the present disclosure, the conductive connection portion includes:

a first conductive connection bar and a second conductive connection bar that are arranged apart in the second direction and both extend in the first direction; and at least two third conductive connection bars located between the first conductive connection bar and the second conductive connection bar and arranged apart in the first direction, wherein two ends of each of the third conductive connection bars are connected to the first conductive connection bar and the second conductive connection bar, respectively;

wherein the first conductive connection bar is connected to the first connection bar, and the second conductive connection bar is connected to the second connection bar.

In an example embodiment of the present disclosure, the first electrode bars, the second electrode bars and the third conductive connection bars extend in a third direction, a first width of each of the first electrode bars, the second electrode bars and the third conductive connection bars is equal to each other;

wherein the first width is a size in a fourth direction, the third direction is perpendicular to the fourth direction, and the third direction intersects with both the first direction and the second direction.

In an example embodiment of the present disclosure, the array substrate further includes second common lines arranged in a same layer as the data lines and arranged apart from the data lines, the second common lines extend in the first direction, and both ends of each of the second common lines are respectively connected through a first via structure to common electrodes of two sub-pixel units of the plurality of sub-pixel units which are adjacent in the first direction.

In an example embodiment of the present disclosure, the first via structure includes a first via portion, a second via portion and a via connection portion, the via connection portion is arranged in the same layer as the pixel electrode and arranged apart from the pixel electrode, the via connection portion is connected to a corresponding one of the second common lines through the first via portion, and the via connection portion is connected to the common electrode through the second via portion.

According to a second aspect of the present disclosure, there is provided an electronic device including the display panel according to any one of the above embodiments.

Other features and advantages of the present disclosure will become apparent from the following detailed description, or be learned in part by practice of the present disclosure.

It should be understood that the above general description and the following detailed description are only exemplary and explanatory, and should not be construed as constituting any limitation on the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative efforts.

DETAILED DESCRIPTION

Figure 1:
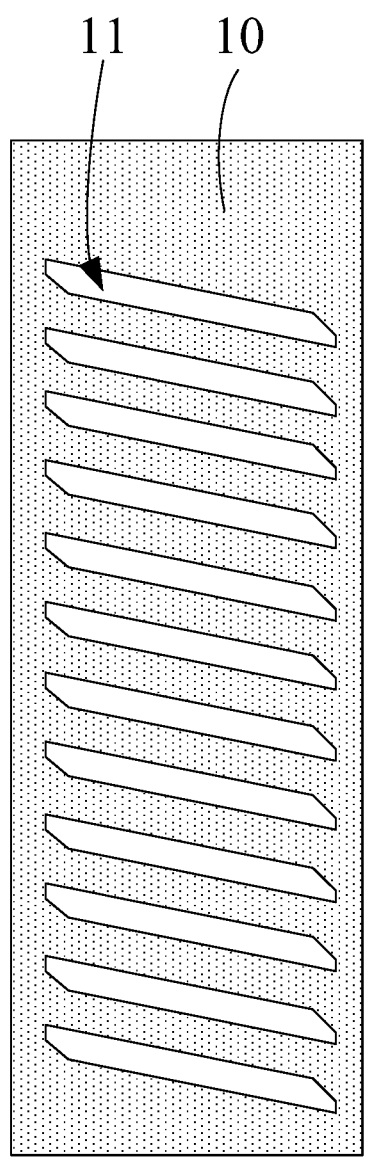
FIG. 1 shows a schematic structural diagram of an electrode structure in the related art.

The technical solutions of the present disclosure will be further specifically described below through embodiments and in conjunction with accompanying drawings. In the specification, the same or similar reference numerals refer to the same or similar parts. The following description of the embodiments of the present disclosure with reference to the accompanying drawings is intended to explain the general concepts of the present disclosure, and should not be construed as any limitation of the present disclosure.

Furthermore, in the following detailed description, for convenience of explanation, numerous specific details are set forth in order to provide a thorough understanding of the embodiments of the present disclosure. Obviously, however, one or more embodiments may be practiced without these specific details.

Thin Film Transistor Liquid Crystal Display (TFT-LCD) technology is a technology that combines microelectronics technology and liquid crystal display technology ingeniously. People use the technology of microelectronic fine processing on Si (silicon base), and then transplant it to large-area glass for TFT array processing to form an array substrate; and then use the mature LCD technology to combine the array substrate with another substrate having a color filter layer (i.e., the opposing substrate) to perform a cell fabrication process to form a liquid crystal cell, and then the liquid crystal display panel is finally formed through post-processes such as polarizer attachment.

It should be understood that the liquid crystal cell also includes at least one spacer (Photo Spacer, PS for short), whose main function is to support the liquid crystal cell, keep the cell thickness of each area of the liquid crystal display panel consistent, and thus ensure the brightness uniformity of the panel. However, for horizontal electric field deflection products such as Advanced Super Dimension Switch (ADS) or In-Plane Switching (IPS), when the panel is subjected to external stress, the PS will move. If the movement is large, the PS may scratch the alignment film (i.e., PI film) on a slit electrode (an electrode structure with a slit), causing the liquid crystal alignment in this area to fail, resulting in occurrence of light leakage at L0, and irregular bright spots formed macroscopically, which affects product quality.

In related arts, as shown in FIG. 1, the graphic design of a slit electrode 10 in a liquid crystal display panel is that slits 11 are provided inside the electrode 10 and regions around the slits 11 are closed. The light efficiency at the periphery regions of the slit electrode 10 is poor, and it is easily to result in bad display effect.

To solve the above problem, embodiments of the present disclosure provide an electrode structure, which can be used in a liquid crystal display panel, and can be used as a pixel electrode or a common electrode of the liquid crystal display panel. For example, the electrode structure can be an Indium Tin Oxid (ITO) electrode which is in a transparent state.

Figure 2:
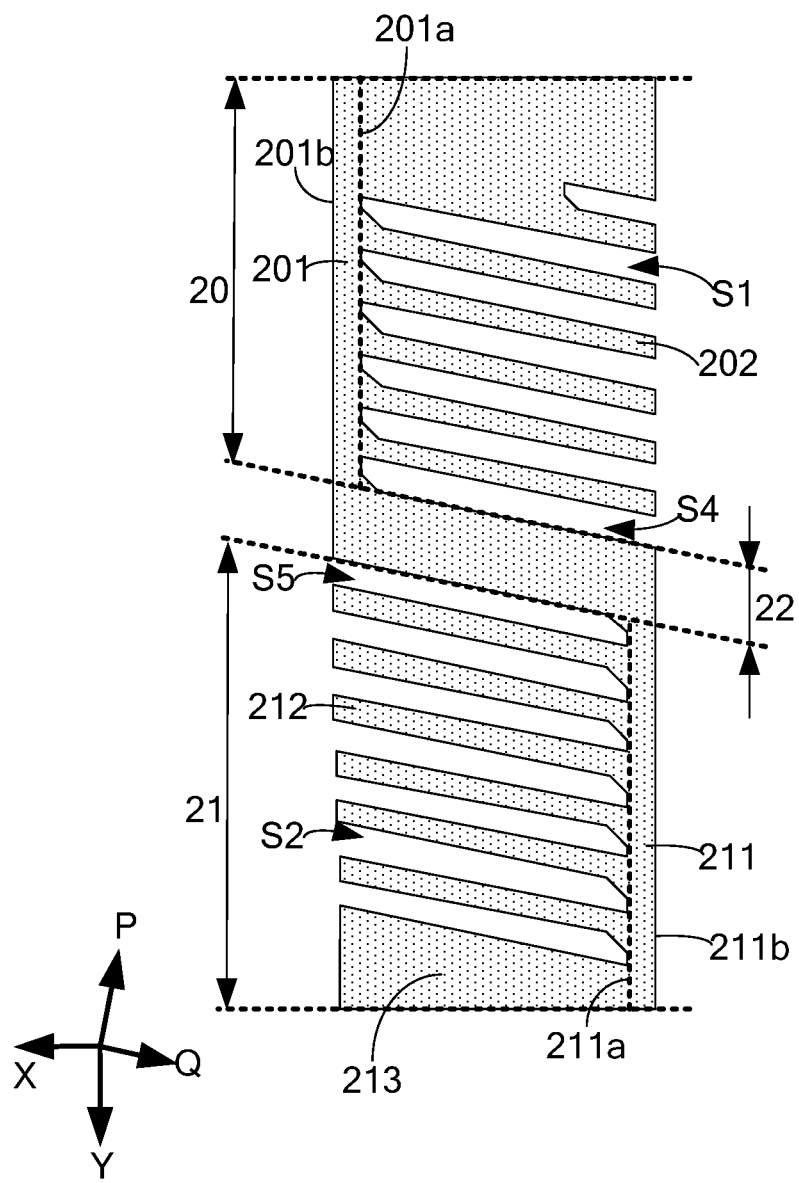
FIG. 2 shows a schematic structural diagram of an electrode structure according to an embodiment of the present disclosure.

As shown in FIG. 2, the electrode structure may include a first electrode portion 20, a conductive connection portion 22, and a second electrode portion 21 that are sequentially arranged in a first direction Y.

The first electrode portion may include a first connection bar 201 extending in the first direction Y and a plurality of first electrode bars 202 arranged apart in the first direction Y The first connection bar 201 has a first side 201a and a second side 201b which are opposite in a second direction X, the plurality of first electrode bars 202 are located on the first side 201a of the first connection bar 201 and connected to the first connection bar 201, and ends of adjacent first electrode bars 202 away from the first connection bar 201 are in an open shape. That is to say, there is no connection between ends of adjacent first electrode bars 202 away from the first connection bar 201.

It should be noted that the aforementioned a plurality of first electrode bars 202 being arranged apart in the first direction Y means that there is a first slit S1 between adjacent first electrode bars 202, and the first slits S1 are half-open.

The second electrode portion 21 includes a second connection bar 211 extending in the first direction Y and a plurality of second electrode bars 212 arranged apart in the first direction Y, the second connection bar 211 is located at a position on the first side 201a away from the second side 201b, the second connection bar 211 has a third side 211a and a fourth side 211b which are opposite in the second direction X, and the third side 211a is located at a position on the fourth side 211b close to the first side 201a. It should be noted that the second direction X is perpendicular to the first direction Y. The plurality of second electrode bars 212 are located on the third side 211a of the second connection bar 211 and connected to the second connection bar 211, and ends of adjacent second electrode bars 212 away from the second connection bar 211 are in an open shape. That is to say, there is no connection between ends of adjacent second electrode bars 212 away from the second connection bar 211.

It should be noted that the aforementioned a plurality of second electrode bars 212 being arranged apart in the first direction Y means that there is a second slit S2 between adjacent second electrode bars 212, and the second slits S1 are half-open.

The conductive connection portion 22 is located between the first electrode portion 20 and the second electrode portion 21, and two ends of the conductive connection portion 22 are connected to the first connection bar 201 and the second connection bar 211, respectively.

In embodiments of the present disclosure, by designing the first electrode portion 20 and the second electrode portion 21 of the electrode structure with half-open first slits S1 and second slits S2, respectively, rotation of liquid crystal molecules can also occur at the opened portions of the first slits S1 and the second slits S2, and thus as compared to the electrode structure in FIG. 1 in which the regions around the slits are closed, the light efficiency around the electrode structure can be improved.

In addition, as shown in FIG. 2, one of the first slits S1 of the first electrode portion 20 and the second slits S2 of the second electrode portion 21 has an opening direction toward the right, and the other has an opening direction toward the left. That is, opening directions of the first slits S1 of the first electrode portion 20 and the second slits S2 of the second electrode portion 21 are opposite, so that the light efficiency of the electrode structure on both sides in the second direction X (i.e.: the left and right sides in FIG. 2) can be balanced, and the light efficiency around the electrode structure is more balanced, so as to improve the display effect.

According to some embodiments, the orthographic projections of the first electrode portion 20, the second electrode portion 21, and the conductive connection portion 22 on a reference plane overlap with each other. The overlap here refers to the complete overlap within an allowable error range. This design can reduce the design difficulty of the electrode structure, thereby facilitating the arrangement of multiple electrode structures in the array substrate. However, embodiments of the present disclosure are not limited to this, and for example, the orthographic projections of the first electrode portion 20, the second electrode portion 21 and the conductive connection portion 22 on the reference plane may not overlap, depending on specific circumstances.

It should be noted that the reference plane in embodiments of the present disclosure is a plane perpendicular to the first direction Y.

The first electrode bars 202 and the second electrode bars 212 may be parallel to each other, that is, the extending directions of the first electrode bars 202 and the second electrode bars 212 are parallel to each other, so as to balance the light efficiency at the first electrode portion 20 and the second electrode portion 20. Specifically, the first electrode bars 202 and the second electrode bars 212 may extend in a third direction Q. The third direction Q intersects with the first direction Y and the second direction X, that is, the third direction Q is not parallel or collinear with the first direction Y and the second direction X. This design can reduce the color shift and improve the display effect.

For example, the acute angle between the third direction Q and the second direction X may be 5° to 15°, such as 5°, 7°, 9°, 11°, 13°, 15°, and so on.

According to some embodiments, a first width of each of the first electrode bars 202 can be equal to a first width of each of the second electrode bars 212. In addition, a first width of each of the first slits S1 can be equal to a first width of each of the second slits S2, so that the light efficiency at the first electrode portion 20 and the second electrode portion 21 can be further balanced to improve the display effect of the product.

It should be noted that the first width mentioned in the present disclosure refers to the size in a fourth direction P, and the fourth direction P and the third direction Q are perpendicular to each other.

In order to ensure good rotation of the liquid crystal molecules at the first electrode portion 20 and the second electrode portion 21 and thus to improve the light efficiency at the first electrode portion 20 and the second electrode portion 21, the first width of each of the first electrode bars 202, the first width of each of the first slits S1, the first width of each of the second electrode bars 212, and the first width of each of the second slits S2 may meet certain requirements; that is, a ratio of the first width of each of the first slits S1 to the first width of each of the first electrode bars 202 can be 1 to 4, such as 1, 1.5, 2, 2.5, 3, 3.5, 4, and so on.

Specifically, the first width of each of the first electrode bars 202 and the second electrode bars 212 in embodiments of the present disclosure may be 1.8 µm to 3 µm, such as 1.8 µm, 2 µm, 2.2 µm, 2.4 µm, 2.6 µm, 2.8 µm, 3 µm, and so on. The first width of each of the first slits S1 and the second slits S2 may be 3 µm to 7 µm, such as 3 µm, 3.5 µm, 4 µm, 4.5 µm, 5 µm, 5.5 µm, 6 µm, 6.5 µm, 7 µm, and so on.

In addition, in order to further balance the light efficiency at the first electrode portion 20 and the second electrode portion 21 to improve the display effect of the product, a second width of the first connection bar 201 and a second width of the second connection bar 211 may be equal. The second width of the first connection bar 201 and the second width of the second connection bar 211 may be equal to the first width of each of the first electrode bars 202 and the first width of each of the second electrode bars 212. However, embodiments of the present disclosure are not limited to this, and for another example, the second width of the first connection bar 201 and the second width of the second connection bar 211 may be slightly larger than the first width of each of the first electrode bars 202 and the first width of each of the second electrode bars 212, so as to improve the light efficiency, while avoiding a situation in which disconnections of the first connection bar 201 and the second connection bar 211 tend occur due to the too small first width, thereby increasing the product yield.

It should be noted that the second width mentioned in embodiments of the present disclosure is a size in the second direction X.

The first electrode portion 20 and the second electrode portion 21 of the electrode structure are connected by the conductive connection portion 22. In order to avoid the conductive connection portion 22 from being affected by impurity particles during the manufacturing process and thereby avoid disconnection to occurs, in some embodiments of the present disclosure, the area of the conductive connection portion 22 is designed to be large to avoid the situation that the conductive connection portion 22 is easily to be broken and may thus cause pixels to fail. According to some embodiments of the present disclosure, the area of the conductive connection portion 22 is larger than the area of each of the first electrode bars 202 and the area of each of the second electrode bars 212.

It should be understood that the whole of the conductive connection portion 22 may extend in the third direction Q to reduce the difficulty in processing and design. For example, when the orthographic projection of the conductive connection portion 22 on the reference plane overlaps the orthographic projection of the first electrode portion 20 and the orthographic projection of the second electrode portion 21 on the reference plane, in order to make the area of the conductive connection portion 22 larger than the area of each of the first electrode bars 202 and the area of each of the second electrode bars 212, the first width of each of the first electrode bars 202 and the first width of each of the second electrode bars 212 can be smaller than the first width of the entire conductive connection portion 22 in some embodiments of the present disclosure.

Figure 3:
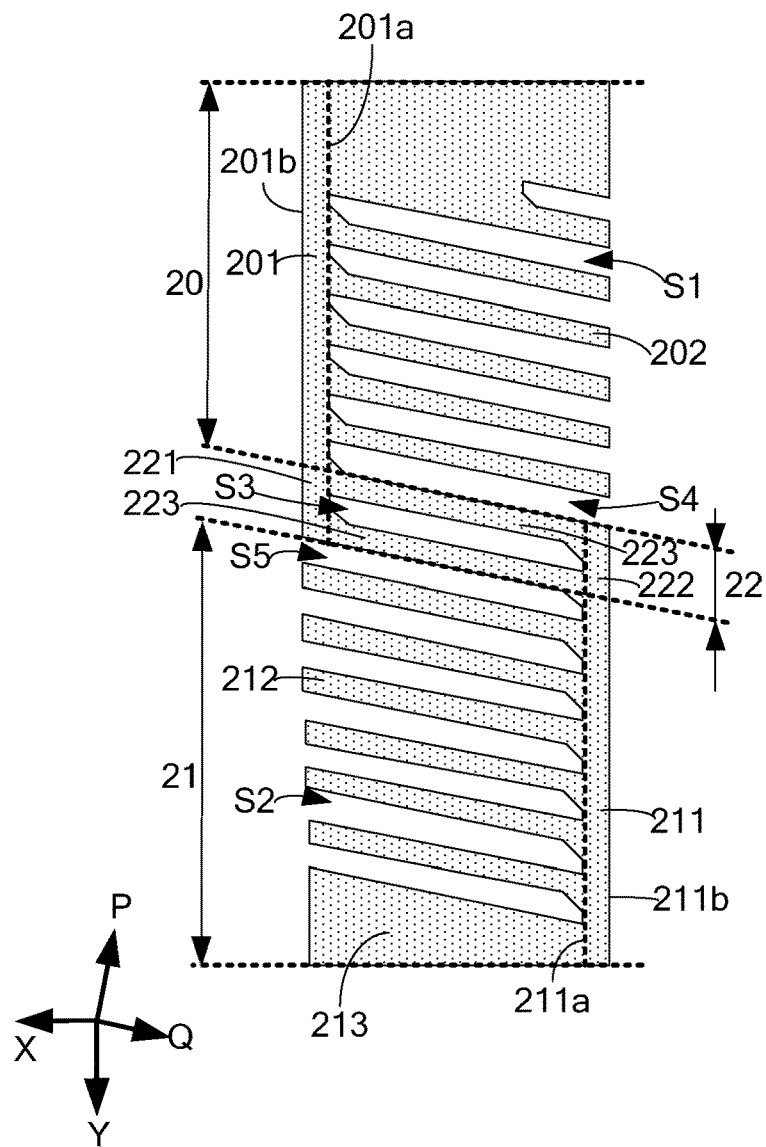
FIG. 3 shows a schematic structural diagram of an electrode structure according to another embodiment of the present disclosure.

In an embodiment of the present disclosure, as shown in FIG. 3, the conductive connection portion 22 may include a first conductive connection bar 221, a second conductive connection bar 222, and at least two third conductive connection bars 223. The first conductive connection 221 and the second conductive connection bar 222 both extend in the first direction Y, and the first conductive connection bar 221 and the second conductive connection bar 222 are arranged apart in the second direction X. The first conductive connection bar 221 is connected to the first connection bar 201, and the second conductive connection bar 222 is connected to the second connection bar 211. The at least two third conductive connection bars 223 are arranged at intervals in the first direction Y and are located between the first conductive connection bar 221 and the second connection bar 221. Two ends of each third conductive connection bar 223 (that is, the two ends in the extending direction) are connected to the first conductive connection bar 221 and the second conductive connection bar 222, respectively, in other words, there is a third slit S3 between the adjacent third conductive connection bars 223, and the third slit S3 is closed.

In embodiments of the present disclosure, the slit (that is, the third slit S3) is provided in the conductive connection portion 22, on the one hand, this can reduce the light efficiency loss at the conductive connection portion 22, thereby improving the overall light efficiency of the electrode structure. On the other hand, the first electrode portion 20 and the second electrode portion 21 can be connected and conducted through at least two wires (i.e.: the third conductive connection bars 223), and thus even if one of the wires is broken due to particles, the other wire can be used to connect the first electrode portion 20 and the second electrode portion 21, thereby greatly reducing the occurrence rate of pixel failure, and thus improving the product yield.

According to some embodiments, two third conductive connection bars 223 are provided to ensure stable connection and conduction between the first electrode portion 20 and the second electrode portion 21, and also, the proportion of the conductive connection portion 22 in the electrode structure can be appropriately reduced. That is, more design space is provided for the first electrode portion 20 and the second electrode portion 21. In other words, the area of the first electrode portion 20 and the area of the second electrode portion 21 can be larger than the area of the conductive connection portion 22. Because the slits in the first electrode portion 20 and the second electrode portion 21 are half-open, and the slit in the conductive connection portion 22 is closed, the light efficiency at the first electrode portion 20 and the second electrode portion 21 is better than that of the conductive connection portion 22. In this way, by making the area of the first electrode portion 20 and the area of the second electrode portion 21 larger than the area of the conductive connection portion 22, the overall light efficiency of the electrode structure can be improved, and the product quality can be improved. In addition, the providing of the third slit S3 can also alleviate the situation that particles fall on the conductive connection portion 22 during the manufacturing process, thereby alleviating the increase in the resistance of the conductive connection portion 22 due to the particles, and accordingly reducing the influence on the driving of the pixels.

However, it should be understood that the number of the third conductive connection bars 223 is not limited to two, and can also be three, four, and so on, depending on specific situations.

In order to further reduce the proportion of the conductive connection portion 22 in the electrode structure, the length of the first conductive connection bar 221 and the length of the second conductive connection bar 222 are both smaller than the length of the first connection bar 201 and smaller than the length of the second connection bar 211. It should be understood that the length mentioned here is the size in the first direction Y.

According to some embodiments, the second width of the first conductive connection bar 221 and the second width of the first connection bar 201 may be equal, and the second width of the second conductive connection bar 222 and the second width of the second connection bar 211 may be equal.

In embodiments of the present disclosure, the third conductive connection bars 223 may extend in the third direction Q. The first width of each of the third conductive connection bars 223 may be equal to the first width of each of the first electrode bars 202. In addition, the third slit S3 between the adjacent third conductive connection bars 223 may be the same as a first slit S1 between adjacent first electrode bars 202 and a second slit S2 between adjacent second electrode bars 212. In this way, the light efficiencies at the conductive connection portion 22, the first electrode portion 20 and the second electrode portion 21 can be balanced, so as to improve the display effect of the product.

Further, a slit between the third conductive connection bars 223 and the first electrode bars 202 is a fourth slit S4, a slit between the third conductive connection bars 223 and the second electrode bars 212 is a fifth slit S5, and each of the fourth slit S4 and the fifth slit S5 is equal to the previously mentioned first slit S1, second slit S2 and the third slit S3. In this way, the light efficiency at the conductive connection portion 22, the first electrode portion 20, the second electrode portion 21, and regions between them can be balanced, thereby improving the display effect of the product.

In another embodiment of the present disclosure, as shown in FIG. 2, the conductive connection portion 22 may be one conductive connection bar extending in the third direction Q. The ratio of the first width of the conductive connection bar to the first width of each of the first electrode bars 202 may be 1.5 to 5.5, that is, the conductive connection portion 22 is wider than each of the first electrode bars 202, so as to avoid the breakage of the conductive connection portion 22, and ensure product quality.

For example, when the conductive connection portion 22 is only one conductive connection bar, the first width of the conductive connection bar may be 5 μm to 10 μm, such as 5 μm, 6 μm, 7 μm, 8 μm, 9 μm, 10 μm, and so on.

In an embodiment of the present disclosure, as shown in FIGS. 2 and 3, the first electrode portion 20 may further include a signal connection portion 203. The signal connection portion 203 may be located on a side of the plurality of second electrode bars 212 away from the conductive connection portion 22 and is connected to the second connection bar 211. For example, when the electrode structure of the present disclosure is a common electrode, the signal connection portion 213 can be connected to a common line in the array substrate, that is, the signal connection portion 213 can be used to receive a common signal. However, embodiments of the present disclosure are not limited to this. When the electrode structure of the present disclosure is a pixel electrode, the signal connection portion 213 can be connected to source and drain electrodes of a transistor in the array substrate for receiving signals transmitted from the source and drain electrodes, such as data signals.

It should be noted that the dotted lines in FIG. 2 and FIG. 3 have no practical meaning, and are only used to distinguish the aforementioned structures to facilitate understanding of the positional relationship between the aforementioned structures.

In addition, it should also be understood that the shape of the signal connection portion 213 is not limited to that shown in FIG. 2 and FIG. 3, and may also be of other shapes, depending on the specific situations. It should also be noted that the electrode structure mentioned in the embodiments of the present disclosure is an integral structure as a whole.

Figure 4:
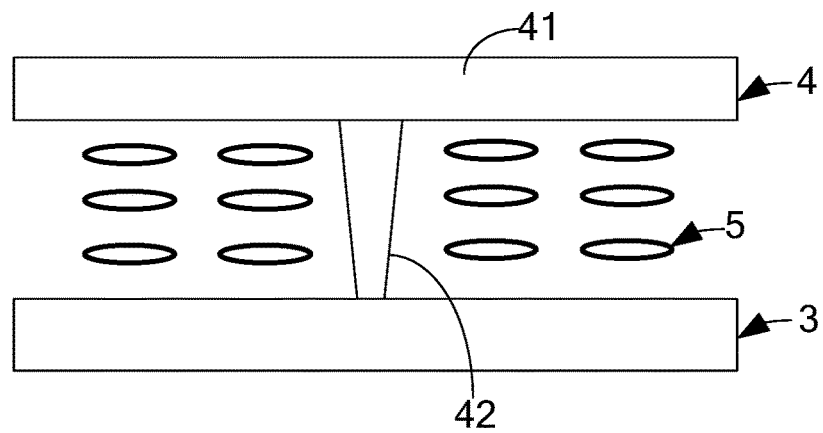
FIG. 4 shows a schematic diagram of a partial structure of a display panel according to an embodiment of the present disclosure.

An embodiment of the present disclosure also provides a display panel, which may be a liquid crystal display panel. As shown in FIG. 4, the display panel may include an array substrate 3 and an opposing substrate 4 which forms a cell with the array substrate 3, and the display panel may further include liquid crystal molecules 5 between the opposing substrate 4 and the array substrate 3.

The display panel according to embodiments of the present disclosure will be described below in detail with reference to FIG. 2 to FIG. 8.

Figure 5:
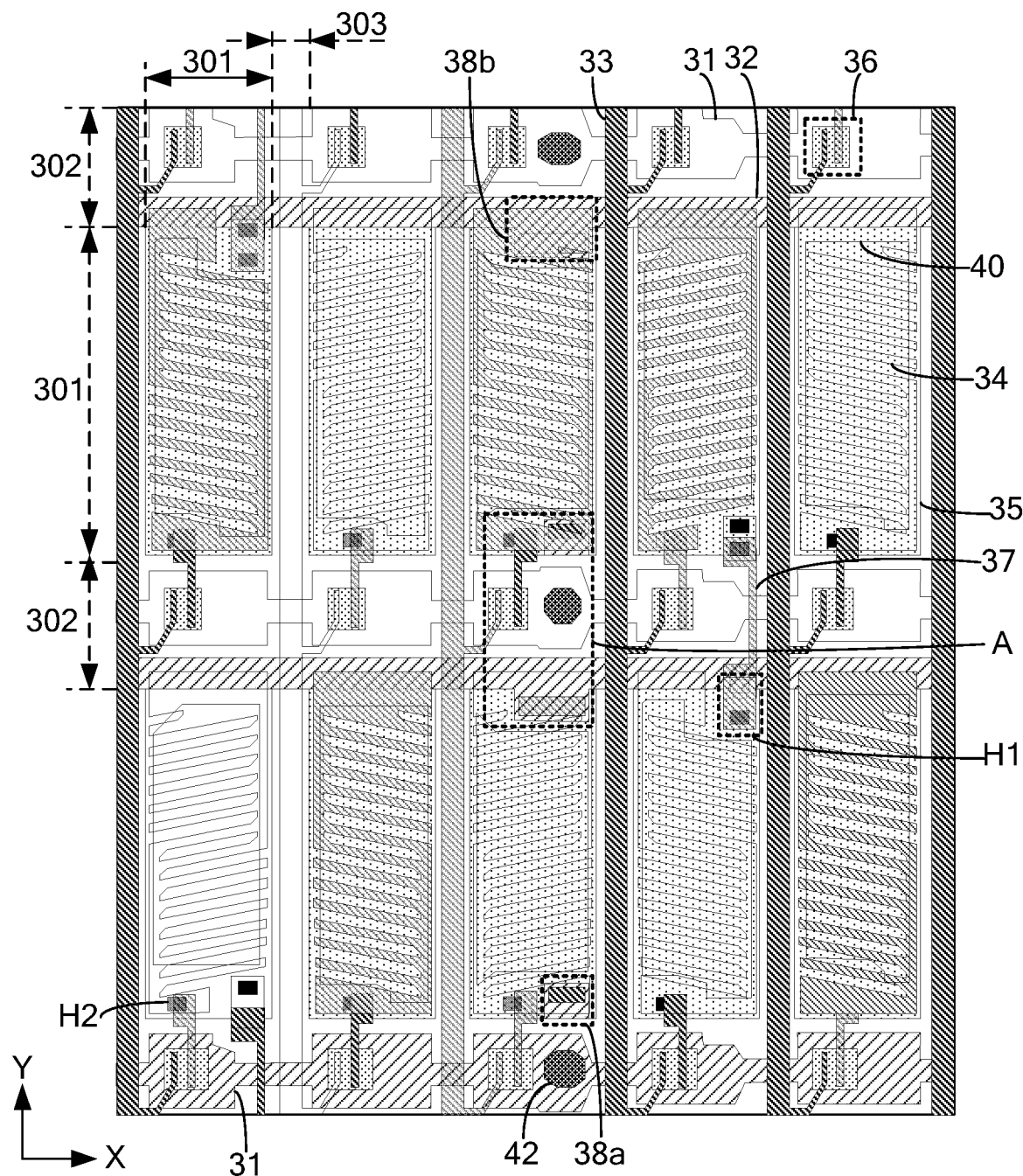
FIG. 5 is a schematic structural diagram of a display panel according to an embodiment of the present disclosure.
Figure 6:
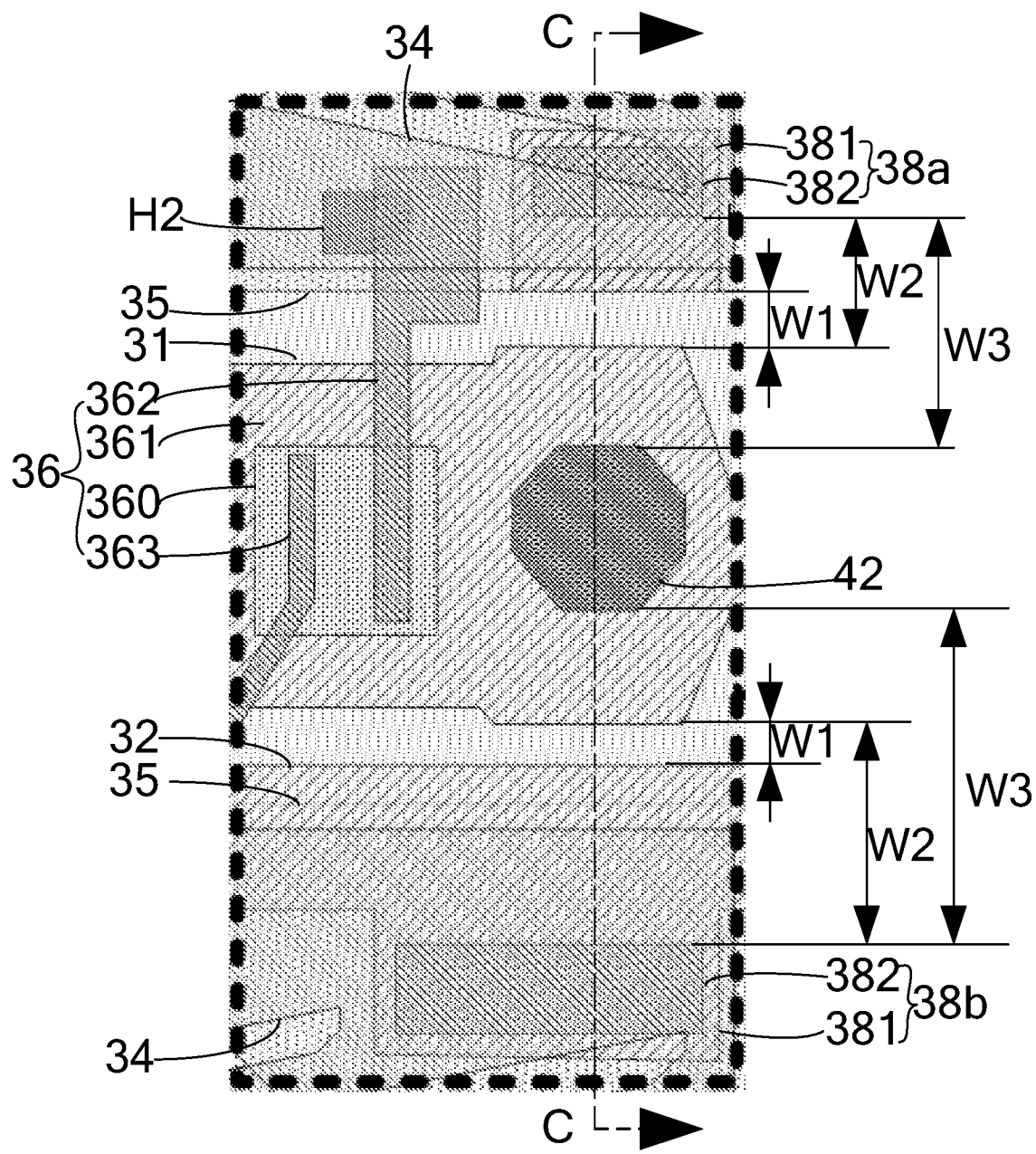
FIG. 6 shows an enlarged structural schematic diagram of a part A shown in FIG. 5.
Figure 7:
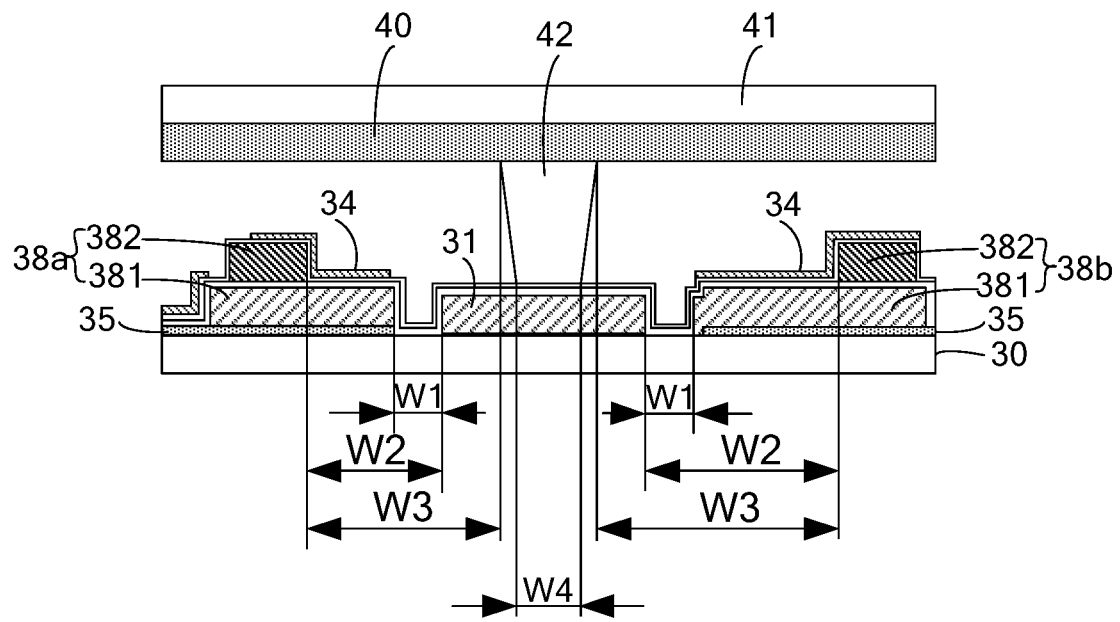
FIG. 7 shows across-sectional structure schematic diagram along a C-C direction in FIG. 6.

As shown in FIG. 5 to FIG. 7, the array substrate 3 may include a first substrate 30, a plurality of sub-pixel units, a plurality of rows of scan lines 31, a plurality of rows of first common lines 32, and a plurality of columns of data lines 33, and the plurality of sub-pixel units, the plurality of rows of scan lines 31, the plurality of rows of first common lines 32, and the plurality of columns of data lines 33 are formed on the first substrate 30.

As shown in FIG. 5, the first substrate 30 has: a plurality of sub-pixel regions 301 arranged in an array along a row direction X and a column direction Y; first wiring regions 302 each of which is located between two adjacent rows of the sub-pixel regions 301; and second wiring regions 303 each of which is located between two adjacent columns. There is an overlap between the first wiring regions 302 and the second wiring regions 303.

For example, as shown in FIG. 7, the first substrate 30 may have a single-layer structure, and the material of the first substrate 30 may be glass. However, the present disclosure is not limited to this. According to some other embodiments, the first substrate 30 may have a multi-layer structure; and the material of the first substrate 30 is not limited to glass, and may be other materials, such as polyimide (PI), etc., depending on the specific situations.

As shown in FIG. 5, a plurality of sub-pixel units are formed on the first substrate 30. Each of the sub-pixel units includes a pixel electrode 34 at least partially located in a corresponding one of the sub-pixel regions 301, a common electrode 35, and a transistor 36 at least partially located in a corresponding one of the first wiring regions 302. In addition, each of the sub-pixels units may further include a storage capacitor (not shown in this figure).

In an embodiment of the present disclosure, as shown in FIG. 5 and FIG. 6, the transistor 36 may include an active layer 360, a gate electrode 361, and a first electrode 362 and a second electrode 363 arranged in the same layer. An insulating layer is provided between the gate electrode 361 and the active layer 360 to insulate the gate electrode 361 and the active layer 360 from each other. The insulating layer can be made of inorganic materials, such as silicon oxide, silicon nitride and other inorganic materials. It should be noted that the gate electrode 361 may be provided in the same layer as the scan lines 31, and the gate electrode 361 may belong to a part of the scan lines 31 mentioned above.

The transistor 36 may be a top-gate type or a bottom-gate type. In the embodiments of the present disclosure, the transistor 36 of a bottom-gate type is taken as an example for description. When the transistor 36 is of the bottom-gate type, the gate electrode 361 is formed on the first substrate 30. The gate electrode 361 may include metal materials or alloy materials, such as molybdenum, aluminum, and titanium, to ensure good conductivity. The insulating layer is formed on the first substrate 30 and covers the gate electrode 361. The insulating layer can be made of inorganic materials, such as silicon oxide or silicon nitride. The active layer 360 is formed on a side of the insulating layer away from the first substrate 30. The first electrode 362 and the second electrode 363 are connected to the two doped regions of the active layer 360, respectively. The first electrode 362 and the second electrode 363 may include a metal material or an alloy material, such as metal single-layer or multi-layer structure formed of molybdenum, aluminum, titanium, and so on. For example, the multi-layer structure is a multi-metal laminate layer, such as a laminate layer formed by three metal layers of titanium, aluminum, and titanium (Al/Ti/Al).

It should be understood that the number of transistors 36 in each sub-pixel unit may be more than one, and the transistors 36 may be classified into N-type and P-type.

In embodiments of the present disclosure, as shown in FIG. 5 and FIG. 6, the pixel electrode 34 may be connected to the first electrode 362. The first electrode 362 of the transistor 36 may be a drain electrode and the second electrode 363 of the transistor 36 may be a source electrode. But, embodiments of the present disclosure are not limited to this, and in some other embodiments, it is also possible that the first electrode 362 of the transistor 36 may be a source electrode, and the second electrode 363 of the transistor 36 may be a drain electrode, depending on specific situations. The orthographic projection of the common electrode 35 on the first substrate 30 overlaps the orthographic projection of the pixel electrode 34 on the first substrate 30.

At least one of the pixel electrode 34 and the common electrode 35 is the electrode structure described in any of the foregoing embodiments, so that the light efficiency around the pixels can be improved, and the product quality can be improved. It should be noted that the row direction X mentioned in this embodiment can be the aforementioned second direction X, and the column direction Y can be the aforementioned first direction Y.

In embodiments of the present disclosure, as shown in FIG. 7, the pixel electrode 34 may be located on a side of the common electrode 35 away from the first substrate 30, that is, the common electrode 35 may be fabricated on the first substrate 30 before the pixel electrode 34 is fabricated. For example, the common electrode 35 can be a plate-shaped electrode; that is, the common electrode 35 is a whole piece without slits; and the pixel electrode 34 can be the electrode structure described in any of the foregoing embodiments. Through the electric field generated between the pixel electrode 34 and the common electrode 35, all the liquid crystal molecules between the electrodes and directly above the electrodes rotate, which can improve the working efficiency of the liquid crystal and increase the light transmission efficiency.

However, the positional relationship between the pixel electrode 34 and the common electrode 35 in embodiments of the present disclosure is not limited to the above-described relationship. For example, according to some other embodiments, the pixel electrode 34 may be located on a side of the common electrode 35 close to the first substrate 30, and the common electrode 35 may be the electrode structure described in any of the foregoing embodiments; the pixel electrode 34 may be a plate-shaped electrode.

In some embodiments of the present disclosure, in order to ensure the light transmittance of the array substrate, the pixel electrode 34 can be made of ITO material. However, the present disclosure is not limited to this. According to some other embodiments, the pixel electrode 34 can be made of transparent materials such as indium zinc oxide (IZO), or zinc oxide (ZnO). Since the material of the pixel electrode 34 is different from that of the gate electrode 361, the first electrode 362 and the second electrode 363 of the transistor 36, the pixel electrode 34 may fabricated by using a patterning process different from the patterning process used for fabricating the gate electrode 361, the first electrode 362 and the second electrode 363 of the transistor 36.

For example, the pixel electrode 34 may be located on a side of the first electrode 362 and the second electrode 363 of the transistor 36 close to the first substrate 30. The common electrode 35 can be formed on the first substrate 30 before the gate electrode 361 of the transistor 36 is formed. That is to say, when the array substrate is fabricated, a patterning process can be used to form the common electrode 35 on the first substrate 30, and then another patterning process is used to form the gate electrode 361 of the transistor 36 on the first substrate 30. It should be noted that although both the common electrode 35 and the gate electrode 361 are formed on the first substrate 30, the common electrode 35 and the gate electrode 361 are disconnected from each other (that is, there is no connection between them). It should be understand that it is also possible that the common electrode 35 can be formed on the first substrate 30 after the gate electrode 361 of the transistor 36 is formed, and the common electrode 35 can be located on a side of the gate electrode 361 away from the first substrate 30, depending on specific situations.

Similarly, in order to ensure the light transmittance of the array substrate, the pixel electrode 34 can be made of transparent conductive materials such as ITO. The pixel electrode 34 can be formed on a side of the first electrode 362 and the second electrode 363 of the transistor 36 away from the first substrate 30. It should be understood that there is an insulating layer between the pixel electrode 34 and the first electrode 362 and the second electrode 363 of the transistor 36. The pixel electrode 34 may be connected to the first electrode 362 of the transistor 36 through a second via structure H2. Specifically, when the pixel electrode 34 is the electrode structure mentioned in the foregoing embodiments, the pixel electrode 34 can be connected to the first electrode 362 of the transistor by the signal connection portion 213 through the second via structure H2. It should be understood that the signal connection portion 213 may be located in a first wiring region 302.

When the pixel electrode 34 is the electrode structure mentioned in the foregoing embodiments, the opening directions of slits in the first electrode portions 20 in the two adjacent pixel electrodes 34 in the first direction Y and the second direction X are opposite, and the opening directions of slits in the second electrode portions 21 are opposite. In addition, it should be noted that the overall shape of each electrode structure in the array substrate 3 may be slightly different. For example, some electrode structures need to be designed to avoid other structures in the array substrate 3, and so on. But, it should be understood that although the overall shapes of the electrode structures in the array substrate 3 may not be exactly the same, the overall design concept should be the same, that is, the first electrode portion 20 and the second electrode portion 21 are both semi-open designs, and the first width of the overall conductive connection portion 22 is greater than the first width of each of the first electrode bars 202 and the first width of each of the second electrode bars 212.

As shown in FIG. 5, at least one row of scan line 31 may be located in a first wiring region 302. In other words, each first wiring region 302 may be provided with at least one row of scan line 31. It should be understood that the entire of scan lines 31 can be regarded as extending in the row direction X. The scan lines 31 are connected to the gate electrodes 361 of the transistors 36 in the sub-pixel units. The scan lines 31 can be arranged in the same layer as the gate electrodes 361 of the transistors 36 and may be formed as an integrated structure with the gate electrodes 361 of the transistors. The scan lines 31 are configured to provide scan signals to the sub-pixel units.

As shown in FIG. 5, at least one row of first common line 32 may be located in a first wiring region 302. In other words, each first wiring region 302 may be provided with at least one row of first common line 32. It should be understood that the entire of the first common lines 32 can be regarded as extending in the row direction X. The first common lines 32 are connected to the common electrodes 35 and are configured to provide common signals to the sub-pixel units.

For example, the first common lines 32 can be arranged in the same layer as the scan lines 31. The aforementioned common electrodes 35 may be disposed on the first substrate 30 prior to the scan lines 31. Therefore, in order to connect the first common lines 32 to the common electrodes 35, in the process of fabricating the first common lines 32, the first common lines 32 may overlap with the common electrodes 35.

For example, as shown in FIG. 5, each first wiring region 302 may be provided with one scan line 31 and one first common line 32. It should be understood that the scan line 31 and the first common line 32 are disconnected from each other. That is, the orthographic projection of the scan line 31 on the first substrate 30 and the orthographic projection of the first common line 32 on the first substrate 30 do not overlap. It should be noted that the first wiring region 302 is not limited to having one scan line 31 and one first common line 32, and according to some other embodiments, two scan lines 31 or no first common lines 32 can be provided, depending on the specific situations. The embodiments of the present disclosure are described by using the example in which one scan line 31 and one first common line 32 are arranged in each first wiring region 302.

As shown in FIG. 5, at least one data line 33 can be located in a second wiring region 303. In other words, at least one data line 33 is provided in each second wiring region 303. It should be understood that the data lines 33 as a whole can be regarded as extending in the column direction Y, and the orthographic projections of the data lines 33 on the first substrate 30 overlap with the orthographic projections of the scan lines 31 and the first common lines 32 on the first substrate 30. The data lines 33 can be connected to the second electrodes 363 of the transistors 36 in the sub-pixel units, and the data lines 33 are configured to provide data signals to the sub-pixel units.

For example, the data lines 33 in the embodiments of the present disclosure can be arranged in the same layer as the first electrodes 362 and the second electrodes 363 of the transistors 36 in the sub-pixel units, that is, the data lines 33, the first electrodes 362 and the second electrodes 363 can be made by the same patterning process to reduce the mask cost. However, the present disclosure is not limited to this. According to some other embodiments, the data lines 36 and the first electrodes 362 and the second electrodes 363 can made with different patterning processes, depending on the specific situations.

For example, as shown in FIG. 5, each second wiring region 303 can be provided with one data line 33, and this data line 33 can be connected to the second electrode 363 of each sub-pixel unit in the same column, that is, the data line 33 can provide data signals for the sub-pixel units in the same column.

In embodiments of the present disclosure, each data line 33 may be symmetrically arranged with respect to its central axis. It should be noted that the central axis mentioned here is a line that passes through the center of the data line 33 and extends in the column direction Y.

According to some embodiments, in a column of sub-pixel units, the distances in the row direction X between the first electrodes 362 of the sub-pixel units and a data line 33 connected to these first electrodes 362 are equal, so as to ensure that the coupling capacitances between transistors 36 in the column of sub-pixel units and the data line 33 are close to be the same, thereby ensuring the uniformity of the light efficiency at each sub-pixel unit in each column. It should be noted that while the distances in the row direction X between the first electrodes 362 of the column of sub-pixel units and the data line 33 connected to these first electrodes 362 are equal, the overlap area between the column of first electrodes 362 and the gate electrodes 361 should be consistent with other columns.

As shown in FIG. 5, the array substrate may further include second common lines 37. The second common lines 37 and the data lines 33 may be arranged in the same layer and arranged apart from each other. The second common lines 37 extend in the first direction Y. The middle part of the orthographic projection of each second common line 37 on the first substrate 30 is located in a first wiring region 302, and the two ends of the orthographic projection of each second common line 37 are located in the sub-pixel regions 301, respectively. In the embodiments of the present disclosure, both ends of the second common line 37 are respectively connected to the common electrodes 35 of two adjacent sub-pixels in the first direction Y through the first via structure H1.

Figure 8:
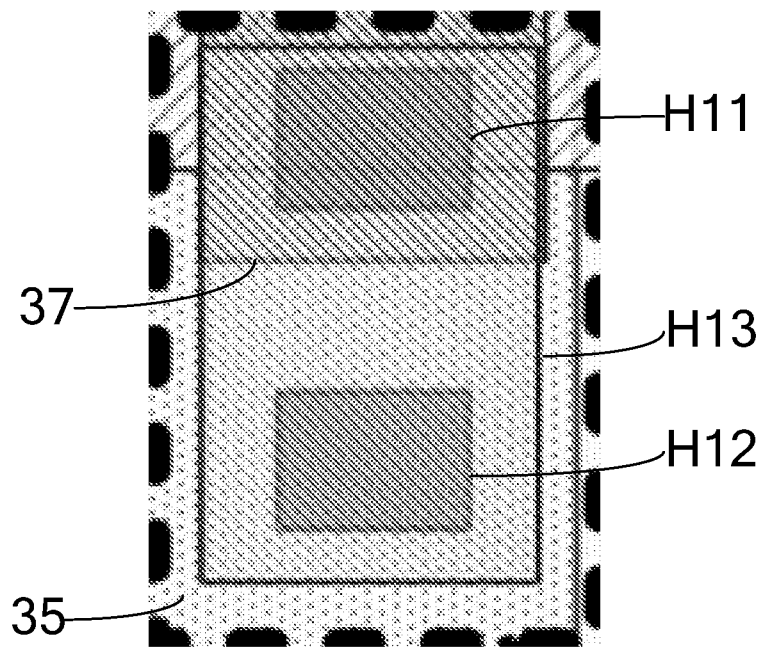
FIG. 8 shows an enlarged schematic view of a first via structure in FIG. 5.

According to some embodiments, as shown in FIG. 8, the first via structure H1 includes a first via portion H11, a second via portion H12 and a via connection portion H13. The via connection portion H13 is arranged in the same layer as the pixel electrode 34 and arranged apart from the pixel electrode 34. The via connection portion H13 is connected to a corresponding one of the second common lines 37 through the first via portion H1, and the via connection portion H13 is connected to the common electrodes 35 through the second via portion H12.

In the embodiments of the present disclosure, as shown in FIG. 5 to FIG. 7, the opposing substrate 4 may further include a second substrate 41, at least one spacer 42 on a side of the second substrate 41 close to the array substrate 3, and a shielding layer 40 on a side of the at least one spacer 42 close to the second substrate 41. For the specific structure of the second substrate 41, reference can be made to the description of the first substrate 30, and details are not repeated here. The orthographic projection of the shielding layer 40 on the first substrate 30 can completely cover the first wiring regions 302, the second wiring regions 303 cover at least part of the sub-pixel regions 30. The at least one spacer 42 may include a plurality of spacers 42. The arrangement of the spacers 42 can improve the uniformity of the overall thickness of the display panel, and can improve the tolerance of the display panel to the fluctuation of liquid crystal molecules, thereby improving the yield of the display panel.

For example, the plurality of spacers 42 may include main spacers and auxiliary spacers. When the display panel does not receive external pressure, ends of the main spacers away from the second substrate 41 are in contact with the array substrate 3 to mainly play a supporting role. When the display panel does not receive external pressure, there is a certain distance between the array substrate 1 and ends of the auxiliary spacers away from the second substrate 41. That is to say, there is a step difference (height difference) between the main spacers and the auxiliary spacers. The thickness of the display panel can be fine-tuned by adjusting the step difference between the main spacers and the auxiliary spacers.

For example, the height of each of the main spacers is greater than the height of each of the auxiliary spacers. When the display panel is subjected to external pressure, the main spacers first bear all the pressure and are compressed. When the main spacers are compressed until the step difference between the main spacers and the auxiliary spaces drops to 0, the main spacers and the auxiliary spacers can bear the external pressure together.

It should be noted that the two kinds of spacers, i.e., the main spacers and auxiliary spacers, can be arranged according to a certain period. The sizes and heights of different types of spacers need to be monitored during the manufacturing process. Because the size of each spacer is small and there are relatively smaller number of main spacers, it is hard to accurately identify positions of the main spacers by a device only depending on the sizes. Usually, the spacer design is vacant at a certain position around a main spacer (i.e., no spacer is provided) to facilitate faster and more accurate identification of the main spacer position and monitor the position. For example, during the design, no spacer is placed under the main spacers, and when monitoring is performed, the positions where no spacer is set can be first quickly determined, and then according to the aforementioned design rules, it can be determined that the spacers above the positions where no spacer is set are the main spacers.

It should be noted that, in the embodiments of the present disclosure, the surface of each of the spacers 42 close to the first substrate 30 may be a top surface, and the surface of each of the spacers 42 away from the first substrate 30 may be a bottom surface. As shown in FIG. 5, the orthographic projection of the top surface of the spacer 42 on the first substrate 30 is within the orthographic projection of a corresponding one of scan lines 31 on the first substrate 30. That is, the outer contour of the orthographic projection of the top surface of the spacer 42 on the first substrate 30 is inside the outer contour of the orthographic projection of the scan line 31 on the first substrate 30, which ensures the flatness of the portion which is supported by the spacer 42, and thus ensures that the spacer 42 stably stands to support the array substrate 3. It should be noted that the orthographic projections of the spacers 42 on the first substrate 30 in the embodiments of the present disclosure do not overlap with the orthographic projections of the data lines 33 and the transistors on the first substrate 30.

It should be understood that the orthographic projection of the top surface of each spacer 42 on the first substrate 30 in the embodiments of the present disclosure may be within the orthographic projection of the bottom surface of the spacer 42 on the first substrate 30. In other words, the spacer 42 can be similar to a tapered shape as a whole, but the shape of the spacer is not limited to this. The orthographic projection of the top surface of the spacer 42 on the first substrate 30 in some other embodiments of the present disclosure can completely overlap with the orthographic projection of the bottom surface of the spacer 42 on the first substrate 30, depending on specific situations.

In addition, it should be noted that the orthographic projection of the bottom surface of the spacer 42 on the first substrate 30 may be located within the orthographic projection of a corresponding one of the scan lines 31 on the first substrate 30, but the present disclosure is not limited to this, and according to some other embodiments, the contour of the spacer 42 in the column direction Y may also exceed the contour of the scan line 31 in the column direction Y.

In order to prevent the spacer 42 from scratching the alignment film after being moved by an external force and causing red spot, a blocking wall can be provided around the spacer 42. Specifically, since the orthographic projection of the spacer 42 on the first substrate 30 is located within the orthographic projection of a corresponding one of the scan lines 31 on the first substrate 30 and the scan line 31 is covered by the blocking layer 40, even if the spacer 42 moves in the row direction X, it is still within the range covered by the shielding layer 40 and will not affect the display effect; based on this, a blocking wall may not be provided on two opposite sides of the spacer 42 in the row direction X to reduce the design difficulty.

In addition, as shown in FIG. 5, transistors are disposed on opposite sides of the spacers 42 in the row direction X, and the overall height of the region where the transistors are located on the array substrate 3 is greater than the overall height of the region where the spacers 42 are located, that is, the transistors here can be used as blocking walls to prevent the spacer 42 from slipping in the row direction X.

In order to prevent the spacers 42 from excessively slipping in the column direction Y due to external force, as shown in FIG. 5 and FIG. 6, a first blocking wall 38*a* and a second blocking wall 38*b* may be provided on the array substrate 3. The first blocking wall 38*a* and the second blocking wall 38*b* are respectively located on opposite sides of a scan line 31 in the column direction Y. The orthographic projection of the spacer 42 on the first substrate 30 may be between the orthographic projections of the first blocking wall 38*a* and the second blocking wall 38*b* on the first substrate 30. In other words, the first blocking wall 38a and the second blocking wall 38b may be provided on opposite sides of the spacer 42 in the column direction Y.

It should be noted that at least part of the first blocking wall 38a and the second blocking wall 38b may be located in the sub-pixel regions 301; the first blocking wall 38a and the second blocking wall 38b may be shielded by the shielding layer 40.

Each of the first blocking wall 38a and the second blocking wall 38b includes a first blocking layer 381 disposed in the same layer as the scan lines 31 and arranged apart from the scan lines and a second blocking layer 382 disposed in the same layer as the data lines 33 and arranged apart from the data lines. The orthographic projection of the second blocking layer 382 on the first substrate 30 overlaps with the orthographic projection of the first blocking layer 381 on the first substrate. As shown in FIG. 5 to FIG. 7, a distance between the first blocking wall 381 and the scan line 31 in the first direction Y is a first distance W1, a distance between the second blocking wall 382 and the scan line 31 in the first direction Y is a second distance W2, and the distance W2 is greater than the first distance W1. That is, the first blocking layer 381 protrudes toward the spacer 42 as compared to the second blocking layer 382, and the protruding part can play a supporting role when the spacer moves under force, so as to alleviate the situation that the spacer 42 falls into the gap between the scan line 31 and the first blocking layer 381 and cannot be restored to the original state. Also, in the embodiments of the present disclosure, the distance between the second blocking layer 382 and the spacer 42 is relatively large. As compared with the technical solution in which the distance between the second blocking layer 382 and the spacer 42 is designed as the same with the distance between the first blocking layer 381 and the spacer 42, when the spacer 42 is subject to the same external stress, the technical solution in embodiments of the present disclosure can reduce the upturning angle of the spacer 42. Thus, when the external stress on the spacer 42 is a force in the horizontal direction (for example, the force in the first direction Y), the resistance in the vertical direction (that is, in the thickness direction of the display panel) can be reduced. In addition, it is more difficult for the spacer 42 to cross the blocking wall to scratch the alignment film in the light-transmitting region (that is, regions in the sub-pixel regions 301 not covered by the shield layer 40), that is, the risk of scratching the alignment film is reduced. In addition, the vertical deformation of the display panel is reduced, and the T-DNU (Touch-Dark Non-uniformity) is also improved.

It should be noted that in the embodiments of the present disclosure, the surface of the spacer 42 close to the first substrate 30 may be the top surface, and the size W4 of the top surface of the spacer 42 in the first direction Y may be greater than the first distance W1, so as to alleviate the situation that the spacer 42 falls into the gap between the scan line 31 and the first blocking layer 381 during movement and cannot be restored to its original state.

According to some embodiments, the ratio between the size W4 of the top surface of the spacer 42 in the first direction Y and the first distance W1 is greater than or equal to 2, so as to further alleviate the situation that the spacer 42 falls into the gap between the scan line 31 and the first blocking layer 381 during movement and cannot be restored to its original state.

The distance between the second blocking layer 382 and the spacer 42 in the first direction Y is a third distance W3, and a ratio between the third distance W3 and the size of the top surface of the spacer 42 in the first direction Y is greater than or equal to 0.5. This design can reduce the risk that the spacer 42 passes over the blocking wall, thereby reducing the risk of scratching the alignment film in the light-transmitting regions. Further, a ration between the third distance W3 and the size W4 of the top surface of the spacer 42 in the first direction Y may be greater than or equal to 1.

For example, the ratio between the third distance W3 and the size of each data line 33 in the second direction X is 2 to 4. The size of the data line 33 in the second direction X may be 5 μm to 7 μm, such as: 5 μm, 5.5 μm, 6 μm, 6.5 μm, 7 μm, and so on. In this case, the third distance W3 may be 10 μm to 28 μm, such as: 10 μm, 13 μm, 17 μm, 21 μm, 25 μm, 28 μm and so on.

It should be understood that the orthographic projection of the aforementioned second blocking layer 382 on the first substrate 30 is located within the orthographic projection of the first blocking layer 381 on the first substrate 30, so as to ensure that the film layers (i.e., the second blocking layers 382) that mainly play a blocking role in the first blocking wall 38a and the second blocking wall 38b has a sufficient width in the first direction Y to better stop the spacer 42 from sliding in the first direction Y. That is to say, as shown in FIG. 7, the longitudinal section of the first blocking wall 38a and the second blocking wall 38b in the embodiments of the present disclosure may appear to be "L"-shaped as a whole. The longitudinal section refers to a surface parallel to the thickness direction of the display panel and the first direction Y.

It should be noted that the first blocking layer 381 of the aforementioned second blocking wall 38b may be a partial structure of a first common line 32. It should also be noted that the first distance W1 and second distance W2 between the second blocking wall 38b and the scan line 31 and the third distance W3 between the second blocking wall 38b and the spacer 42 may be equal to or different from the first distance W1 and second distance W2 between the first blocking wall 38a and the scan line 31 and the third distance W3 between the first blocking wall 38b and the spacer 42, depending on the specific situations.

In some embodiments of the present disclosure, in addition to completely covering the first wiring region 302 and the second wiring region 303, the above-mentioned shielding layer 40 may also cover part of the sub-pixel region 301, and specifically, may cover part of the common electrode 35 and part of the pixel electrode 34. At the edge region of the pixel electrode 34 close to the scan line 31 and the data line 33, there is a coupling electric field. During the display process, the liquid crystal arrangement will be disordered, resulting in an ineffective region and light leakage from the edge of the dark state pixels. Therefore, the shielding layer 40 is required to shield this part of the ineffective region.

For example, there is a coupling electric field between the pixel electrode 34 and the scan line 31, that is to say, a portion of the pixel electrode 34 close to the scan line 31 has an ineffective region. In order to shield the ineffective region, in the column direction Y, the shielding layer 40 may cover the edge of the pixel electrode 34 by at least 5 μm. It should be noted that when the color filter layer is located on the opposing substrate, considering the accuracy in perform cell fabrication process of the upper and lower substrates, the covered edge needs to be wider, but it should not exceed 10 μm to avoid excessive influence on the aperture ratio of the pixels.

In addition, there is also a coupling electric field between the data line 33 and the edge of the pixel electrode 34. That is to say, in some embodiments of the present disclosure, a portion of the pixel electrode 34 close to the data line 33 has an ineffective region. The liquid crystal molecules 5 may negative liquid crystal molecules, and the electric field will not cause the liquid crystal to rotate, and the shielding layer 40 can cover the edge of the pixel electrode 34 by about 1 μm to shield the shadow region near the data line 33. If the liquid crystal molecules 5 are positive liquid crystal molecules, the coupling electric field between the data line 33 and the pixel electrode 34 will not cause obvious light leakage in the dark state, but the liquid crystal molecules may cause the crosstalk phenomenon to be aggravated. In this case, the shielding layer 40 can cover the edge of the pixel electrode 34 by at least 6 μm to shield the coupling electric field region.

It should be noted that the color filter layer used in the liquid crystal display panel may be located on the opposing substrate 4 or on the array substrate 3, depending on the specific situations.

Based on the above content, the liquid crystal display panel of the embodiments of the present disclosure can be used in display products with 4K resolution or 8K resolution.

An embodiment of the present disclosure also provides an electronic device including the display panel described in any one of the above embodiments.

According to some embodiments of the present disclosure, the specific type of the electronic device is not particularly limited, and any type of electronic device commonly used in the art can be used, such as liquid crystal display, mobile device such as mobile phone or laptop computer, wearable device such as watch, VR device, and so on. One of ordinary skill in this art can make proper selection according to the specific use of the display device, which will not be described in detail here.

It should be noted that in addition to the display panel, the electronic device may further include other necessary members and components. Taking the display as an example, it may further include a backlight module, a casing, a main circuit board, a power line, and so on, and one of ordinary skill in this art can make corresponding supplements according to the specific usage requirements of the electronic device, which will not be described in detail here.

It should be noted that "on", "formed on" and "arranged on" herein can mean that one layer is directly formed or arranged on another layer, or that one layer is formed or arranged indirectly on another layer, that is, there may be other layers between the two layers.

The terms "a", "an", "the", "said" and "at least one" are used to indicate the presence of one or more elements/components, and so on; the terms "include" and "have" are open terms and means inclusive, and refers to that in addition to the listed elements/components and so on, there may be other elements/components and so on.

It should be noted that although the terms "first", "second", and so on may be used to describe various members, components, elements, regions, layers and/or parts, these members, components, elements, regions, and layers and/or parts should not be limited by these terms. Rather, these terms are used to distinguish one member, component, element, region, layer, and/or part from another member, component, element, region, layer, and/or part.

In the present disclosure, unless otherwise specified, the term "arranged/provided in a same layer" means that two layers, components, members, elements or parts can be formed by the same patterning process, and the two layers, components, members, elements or parts are generally formed of the same material.

In the present disclosure, unless otherwise specified, the expression "patterning process" generally includes steps of photoresist coating, exposure, development, etching, and photoresist stripping, and so on. The expression "one patterning process" means a process of forming patterned layers, components, members, and so on using one mask.

Those skilled in the art will easily think of other embodiments of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and embodiments are only regarded as exemplary, and the true scope and spirit of the present disclosure are defined by the appended claims.

What is claimed is:

1. A display panel, comprising an array substrate and an opposing substrate which forms a cell with the array substrate:
wherein:
the array substrate comprises a first substrate, scan lines, data lines, a first blocking wall and a second blocking wall, and the scan lines, the data lines, the first blocking wall and the second blocking wall are formed on a side of the first substrate close to the opposing substrate;
the data lines extend in a first direction, the scan lines extend in a second direction, and the first direction intersects with the second direction;
the first blocking wall and the second blocking wall are respectively arranged on opposite sides of at least one of the scan lines in the first direction, and each of the first blocking wall and the second blocking wall comprises a first blocking layer arranged in a same layer as the scan lines and arranged apart from the scan lines and a second blocking layer arranged in a same layer as the data lines and arranged apart from the data lines, and an orthographic projection of the second blocking layer on the first substrate overlaps with an orthographic projection of the first blocking layer on the first substrate;
a distance between the first blocking layer and a corresponding one of the scan lines in the first direction is a first distance, a distance between the second blocking layer and the corresponding one of scan lines in the first direction is a second distance, and the second distance is greater than the first distance;
wherein:
the opposing substrate comprises a second substrate and a spacer on a side of the second substrate close to the array substrate, a surface of the spacer close to the first substrate is a top surface, and an orthographic projection of the top surface of the spacer on the first substrate is within an orthographic projection of the corresponding one of the scan lines on the first substrate and between orthographic projections of the first blocking wall and the second blocking wall on the first substrate; and
a size of the top surface of the spacer in the first direction is greater than the first distance;
wherein the orthographic projection of the second blocking layer on the first substrate is within the orthographic projection of the first blocking layer on the first substrate, and the first direction is perpendicular to the second direction;

wherein the array substrate further comprises first common lines formed on the first substrate and extending in the second direction, and the first common lines and the scan lines are arranged in a same layer and arranged apart from each other;

wherein the first blocking layer of the second blocking wall is a partial structure of a corresponding one of the first common lines;

wherein the array substrate further comprises a plurality of sub-pixel units, which are arranged as an array on the first substrate along the second direction and the first direction;

wherein each of the sub-pixel units comprises a pixel electrode, a common electrode and a transistor, wherein:

the transistor comprises a gate electrode, a first electrode and a second electrode, the gate electrode is connected to one of the scan lines, the first electrode is connected to the pixel electrode, and the second electrode is connected to one of the data lines;

wherein an orthographic projection of the common electrode on the first substrate overlaps with an orthographic projection of the pixel electrode on the first substrate, and the common electrode is connected to one of the first common lines;

wherein the pixel electrode is arranged on a side of the common electrode away from the first substrate, and the pixel electrode comprises:

a first electrode portion comprising a first connection bar extending in a first direction and a plurality of first electrode bars arranged at intervals in the first direction, wherein the first connection bar has a first side and a second side which are opposite in the second direction, the plurality of first electrode bars are arranged on the first side of the first connection bar and connected to the first connection bar, and ends of adjacent first electrode bars away from the first connection bar are in an open shape;

a second electrode portion arranged apart from the first electrode portion in the first direction, wherein the second electrode portion comprises a second connection bar extending in the first direction and a plurality of second electrode bars arranged at intervals in the first direction, the second connection bar is located at a position on the first side away from the second side, the second connection bar has a third side and a fourth side which are opposite in the second direction, the third side is located at a position on the fourth side close to the first side, the plurality of second electrode bars are arranged on the third side of the second connection bar and connected to the second connection bar, and ends of adjacent second electrode bars away from the second connection bar are in an open shape; and a conductive connection portion arranged between the first electrode portion and the second electrode portion, wherein both ends of the conductive connection portion are connected to the first connection bar and the second connection bar, respectively, and an area of the conductive connection portion is larger than an area of each of the first electrode bars and an area of each of the second electrode bars;

wherein the conductive connection portion comprises:

a first conductive connection bar and a second conductive connection bar that are arranged apart in the second direction and both extend in the first direction; and at least two third conductive connection bars located between the first conductive connection bar and the second conductive connection bar and arranged apart in the first direction, wherein two ends of each of the third conductive connection bars are connected to the first conductive connection bar and the second conductive connection bar, respectively;

wherein the first conductive connection bar is connected to the first connection bar, and the second conductive connection bar is connected to the second connection bar.

2. The display panel according to claim 1, wherein a ratio between the size of the top surface of the spacer in the first direction and the first distance is greater than or equal to 2.

3. The display panel according to claim 2, wherein a distance between the second blocking layer and the spacer in the first direction is a third distance, and a ratio between the third distance and the sizes of the top surface of the spacer in the first direction is greater than or equal to 0.5.

4. The display panel according to claim 3, wherein the ratio between the third distance and the size of the top surface of the spacer in the first direction is greater than or equal to 1.

5. The display panel according to claim 3, wherein the ratio between the third distance and a size of each of the data lines in the second direction is 2 to 4.

6. The display panel according to claim 1, wherein the first electrode bars, the second electrode bars and the third conductive connection bars extend in a third direction, a first width of each of the first electrode bars, the second electrode bars and the third conductive connection bars is equal to each other;

wherein the first width is a size in a fourth direction, the third direction is perpendicular to the fourth direction, and the third direction intersects with both the first direction and the second direction.

7. The display panel according to claim 1, wherein the array substrate further comprises second common lines arranged in a same layer as the data lines and arranged apart from the data lines, the second common lines extend in the first direction, and both ends of each of the second common lines are respectively connected through a first via structure to common electrodes of two sub-pixel units of the plurality of sub-pixel units which are adjacent in the first direction.

8. The display panel according to claim 7, wherein the first via structure comprises a first via portion, a second via portion and a via connection portion, the via connection portion is arranged in the same layer as the pixel electrode and arranged apart from the pixel electrode, the via connection portion is connected to a corresponding one of the second common lines through the first via portion, and the via connection portion is connected to the common electrode through the second via portion.

9. An electronic device, comprising: a display panel, which comprises an array substrate and an opposing substrate which forms a cell with the array substrate:

wherein:

the array substrate comprises a first substrate, scan lines, data lines, a first blocking wall and a second blocking wall, and the scan lines, the data lines, the first blocking wall and the second blocking wall are formed on a side of the first substrate close to the opposing substrate;

the data lines extend in a first direction, the scan lines extend in a second direction, and the first direction intersects with the second direction;

the first blocking wall and the second blocking wall are respectively arranged on opposite sides of at least one of the scan lines in the first direction, and each of the first blocking wall and the second blocking wall comprises a first blocking layer arranged in a same layer as the scan lines and arranged apart from the scan lines and a second blocking layer arranged in a same layer as the data lines and arranged apart from the data lines, and an orthographic projection of the second blocking layer on the first substrate overlaps with an orthographic projection of the first blocking layer on the first substrate;

a distance between the first blocking layer and a corresponding one of the scan lines in the first direction is a first distance, a distance between the second blocking layer and the corresponding one of scan lines in the first direction is a second distance, and the second distance is greater than the first distance;

wherein:
the opposing substrate comprises a second substrate and a spacer on a side of the second substrate close to the array substrate, a surface of the spacer close to the first substrate is a top surface, and an orthographic projection of the top surface of the spacer on the first substrate is within an orthographic projection of the corresponding one of the scan lines on the first substrate and between orthographic projections of the first blocking wall and the second blocking wall on the first substrate; and a size of the top surface of the spacer in the first direction is greater than the first distance;

wherein the orthographic projection of the second blocking layer on the first substrate is within the orthographic projection of the first blocking layer on the first substrate, and the first direction is perpendicular to the second direction;

wherein the array substrate further comprises first common lines formed on the first substrate and extending in the second direction, and the first common lines and the scan lines are arranged in a same layer and arranged apart from each other;

wherein the first blocking layer of the second blocking wall is a partial structure of a corresponding one of the first common lines;

wherein the array substrate further comprises a plurality of sub-pixel units, which are arranged as an array on the first substrate along the second direction and the first direction;

wherein each of the sub-pixel units comprises a pixel electrode, a common electrode and a transistor, wherein:
the transistor comprises a gate electrode, a first electrode and a second electrode, the gate electrode is connected to one of the scan lines, the first electrode is connected to the pixel electrode, and the second electrode is connected to one of the data lines;

wherein an orthographic projection of the common electrode on the first substrate overlaps with an orthographic projection of the pixel electrode on the first substrate, and the common electrode is connected to one of the first common lines;

wherein the pixel electrode is arranged on a side of the common electrode away from the first substrate, and the pixel electrode comprises:
a first electrode portion comprising a first connection bar extending in a first direction and a plurality of first electrode bars arranged at intervals in the first direction, wherein the first connection bar has a first side and a second side which are opposite in the second direction, the plurality of first electrode bars are arranged on the first side of the first connection bar and connected to the first connection bar, and ends of adjacent first electrode bars away from the first connection bar are in an open shape;

a second electrode portion arranged apart from the first electrode portion in the first direction, wherein the second electrode portion comprises a second connection bar extending in the first direction and a plurality of second electrode bars arranged at intervals in the first direction, the second connection bar is located at a position on the first side away from the second side, the second connection bar has a third side and a fourth side which are opposite in the second direction, the third side is located at a position on the fourth side close to the first side, the plurality of second electrode bars are arranged on the third side of the second connection bar and connected to the second connection bar, and ends of adjacent second electrode bars away from the second connection bar are in an open shape; and a conductive connection portion arranged between the first electrode portion and the second electrode portion, wherein both ends of the conductive connection portion are connected to the first connection bar and the second connection bar, respectively, and an area of the conductive connection portion is larger than an area of each of the first electrode bars and an area of each of the second electrode bars;

wherein the conductive connection portion comprises:
a first conductive connection bar and a second conductive connection bar that are arranged apart in the second direction and both extend in the first direction; and at least two third conductive connection bars located between the first conductive connection bar and the second conductive connection bar and arranged apart in the first direction, wherein two ends of each of the third conductive connection bars are connected to the first conductive connection bar and the second conductive connection bar, respectively;

wherein the first conductive connection bar is connected to the first connection bar, and the second conductive connection bar is connected to the second connection bar.

10. The electronic device according to claim 9, wherein a ratio between the size of the top surface of the spacer in the first direction and the first distance is greater than or equal to 2.

11. The electronic device according to claim 10, wherein a distance between the second blocking layer and the spacer in the first direction is a third distance, and a ratio between the third distance and the sizes of the top surface of the spacer in the first direction is greater than or equal to 0.5.

12. The electronic device according to claim 11, wherein the ratio between the third distance and the size of the top surface of the spacer in the first direction is greater than or equal to 1.

13. The electronic device according to claim 12, wherein the ratio between the third distance and a size of each of the data lines in the second direction is 2 to 4.

\* \* \* \* \*